United States Patent [19]
Müller et al.

[11] Patent Number: 5,524,871
[45] Date of Patent: Jun. 11, 1996

[54] METHOD OF MAKING A SHOCK ABSORBER AND A SHOCK ABSORBER MADE BY THE METHOD

[75] Inventors: Horst Müller, Münnerstadt; Karl-Heinz Hofmann, Gochsheim; Frank D. Ilzig, Schweinfurt; Werner Baloun, Bergtheim; Ludwig Gampl, Schwanfeld; Norbert Vockentänzer, Schweinfurt; Günther Hochrein, Poppenlauer; Karel Kriz, Poppenhausen, all of Germany

[73] Assignee: Fichtel & Sachs AG, Schweinfurt, Germany

[21] Appl. No.: 338,332

[22] Filed: Nov. 14, 1994

[30] Foreign Application Priority Data

Nov. 12, 1993 [DE] Germany .......................... 43 38 722.5

[51] Int. Cl.⁶ ............................. F17C 5/06; F15B 15/00
[52] U.S. Cl. ......................... 267/64.28; 141/4; 141/37; 53/403; 53/489; 53/478; 53/88; 53/101; 53/319; 53/329.2
[58] Field of Search .................... 141/4, 37, 39, 141/98; 53/403, 489, 478, 88, 101, 319, 329.2; 188/322.17, 322.19, 322.21, 269; 267/64.28; 219/60 R, 121.64, 121.84

[56] References Cited

U.S. PATENT DOCUMENTS

| | | | |
|---|---|---|---|
| 4,071,057 | 1/1978 | Nagase | 141/4 |
| 5,398,789 | 3/1995 | Handke | 188/322.19 |

FOREIGN PATENT DOCUMENTS

| | | | |
|---|---|---|---|
| 0411362 | 2/1991 | European Pat. Off. | |
| 1267472 | 12/1968 | Germany. | |
| 2455901 | 8/1978 | Germany. | |
| 8180848 | 10/1983 | Japan | 267/64.28 |

Primary Examiner—Josie Ballato
Attorney, Agent, or Firm—Nils H. Ljungman and Associates

[57] ABSTRACT

Process for the filling of a piston-cylinder unit, for example a shock absorber, with compressed gas and for closing the gas chamber of the piston-cylinder unit with a sealing element in the form of a base. The piston-cylinder unit is placed in an apparatus which apparatus can be connected to a compressed gas source from which the gas chamber is filled. The base is inserted by the apparatus into the open end of the piston-cylinder unit, after which the piston-cylinder unit, now under pressure and closed off by the base, is closed by the process of welding.

8 Claims, 6 Drawing Sheets

PRIOR ART

FIG. 4

PRIOR ART

METHOD OF MAKING A SHOCK ABSORBER AND A SHOCK ABSORBER MADE BY THE METHOD

BACKGROUND OF THE INVENTION

1. Field of the Invention

The present invention generally relates to a process and apparatus for the filling of a gas chamber of a piston-cylinder unit, for example a shock absorber, with compressed gas, and for closing this gas chamber with a closing element in the form of a base.

2. Background Information

European Patent Application No. 0 411 362 discloses a piston-cylinder unit in which an opening is made in the wall of the cylinder and the piston-cylinder unit is filled with a compressed gas medium via this opening. The opening is subsequently welded shut. The disadvantage of this process and/or unit is that only a relatively small opening is available. Accordingly, the filling process can essentially only proceed slowly. Furthermore, there is a reduction in the wall thickness which determines the pressure level inside the gas chamber.

German Patent Application No. 12 67 472 discloses a piston-cylinder unit which has a separate base which includes a filling opening. A piston-cylinder unit with a separate base can be manufactured under more favorable conditions than a piston-cylinder unit in which the cylinder and the base are realized as an integral unit, such as that disclosed in European Patent Application 0 411 362. However, there is reason to doubt whether a reliable seal can be realized by means of a caulking tool.

German Patent Application No. 24 55 901 also discloses an apparatus for closing a gas chamber in which gas filling takes place via the cylinder, the cylinder being open on one end of the piston-cylinder unit. The disadvantage of this type and manner of closure is the beading of the cylinder with a sealing element. If one imagines that the piston-cylinder unit is realized as a McPherson strut unit which must transfer torque via a drop arm on the cylinder, for example, this beading appears unsuitable since it is essentially unable to transfer torque. Another disadvantage is the disproportionately thick base, which in a shock absorber can negatively influence the unsprung weight.

OBJECT OF THE INVENTION

The object of the present invention is to realize a filling process and apparatus for a piston-cylinder unit, which process and apparatus can essentially guarantee rapid filling with an extremely reliable closure. It must also be possible to transfer torque between the cylinder and the base of the piston-cylinder unit.

SUMMARY OF THE INVENTION

To achieve this object, the present invention teaches the use of a sealing element, preferably in the form of a base, for filling a gas chamber of a piston-cylinder unit with compressed gas and for closing this gas chamber. The piston-cylinder unit can preferably be placed in an apparatus, which apparatus can be connected to a compressed gas source from which the gas chamber is filled. The base can preferably be inserted by the apparatus into the open end of the piston-cylinder unit. After the insertion of the base into the piston-cylinder unit, the piston-cylinder unit, now under pressure and closed off by the base, can preferably be closed by means of a welding process which can be performed in the apparatus. This process combines two advantages: the filling with gas can take place via the large cross-section of the open cylinder, and, a separate base can be used for the piston-cylinder unit. Preferably as a result of the welding process which welds the base to the cylinder, torque can also be transferred between the cylinder and a counter force acting on the base.

It has proven particularly advantageous if the welding process is preferably performed by means of resistance welding, in particular, capacitor discharge welding. This special process is characterized by a high processing speed and reliability. This process can preferably result in a seam which requires essentially no extra finishing operations, and this seam exhibits a high degree of freedom from warping due to its low thermal expansion.

In carrying out the process in accordance with the present invention, it can be particularly advantageous to use an apparatus which apparatus includes a slip-on unit. The slip-on unit can preferably have a filling chamber with a delivery connection, which chamber preferably forms a connection to a compressed gas source. The slip-on unit can also preferably include a base support which can hold the base during the assembly process. The slip-on unit can preferably be mobile relative to the piston-cylinder unit, so that in one operating position of the slip-on unit, the end of the piston-cylinder unit, after insertion of the base, can be accessible so that a welding apparatus can preferably be inserted. The apparatus described immediately above can advantageously perform two functions, the first function being that the apparatus can preferably hold the piston-cylinder unit, which piston-cylinder unit is essentially complete except for the gas charge, and the second function being that the apparatus can also be used to weld the piston-cylinder unit shut after the piston-cylinder unit has been charged with gas.

Another particularly advantageous feature of the present invention is that the slip-on unit can be displaced axially with respect to the piston-cylinder unit. By means of the axial movement of the slip-on unit, it can be easier to seal the filling chamber against the piston-cylinder unit, since simple O-rings can preferably be used for sealing purposes.

It has proven particularly advantageous for the closing of the piston-cylinder unit if the base support of the present invention can preferably be formed essentially by a welding electrode. This double function of a component, i.e. the base support, of the apparatus can significantly simplify the overall design of the apparatus in accordance with the present invention.

Another particularly advantageous feature of the present invention is that the welding electrode can preferably be configured to have essentially the same outside diameter as the piston-cylinder unit. If one imagines that only the top end of the piston-cylinder unit extends into the slip-on unit, and that the welding electrode is moved toward the piston-cylinder unit during the test process, the slip-on unit can be moved away from the piston-cylinder unit toward the welding electrode, preferably as a result of the essential equivalency between the outside diameter of the piston-cylinder unit and the outside diameter of the welding electrode, so that the displacement can be kept particularly short, or at a minimum.

In accordance with an alternative embodiment of the present invention, the welding electrode can be oriented so that the welding apparatus can essentially be concentric with respect to the base support. The realization of the base support and the welding electrode as two separate pieces can make it possible for the base to be placed and held in the base support, preferably by means of friction or clamping forces during the test process. However, it is also possible to realize the base support in the form of a permanent magnet or an electromagnet which can hold the base. In accordance with the embodiment of the present invention in which the base support simultaneously serves as the welding electrode, two separate circuits can preferably be connected to the welding electrode, one circuit which preferably holds the base by means of a very slight magnetic current, and another circuit which preferably welds the base to the piston-cylinder unit preferably by means of a stronger welding current.

The piston-cylinder unit manufactured in accordance with the present invention generally includes a cylinder tube, which cylinder tube can preferably be closed on one end and can be filled via the other, open end. After filling, the cylinder tube preferably forms a gas chamber closed by a base, whereby a seal can be located between the base and the cylinder tube. The seal located between the base and the cylinder tube preferably seals the gas chamber against the atmosphere, preferably before the welding process takes place. The tightness of the piston-cylinder unit after welding can preferably be ensured by the weld seam itself. During the welding process, the seal located between the base and the cylinder tube is essentially only required to ensure that no compressed gas can escape from the piston-cylinder unit, i.e. during the welding process.

One aspect of the invention resides broadly in a process of making a shock absorber for a motor vehicle by using an apparatus for assembling, the process comprising the steps of: providing a cylinder, the cylinder defining a chamber therein, the cylinder having a first end portion and a second end portion; providing a damping medium; providing a piston rod, the piston rod having a longitudinal axis, the longitudinal axis defining an axial direction; providing a piston; providing first means for connecting the shock absorber to the body of a motor vehicle; providing second means for connecting the shock absorber to the suspension of a motor vehicle; providing the apparatus for assembling; the process further comprising the steps of: filling at least a portion of the chamber with the damping medium; closing and sealing the first end portion of the cylinder; attaching the piston to the piston rod; inserting the piston rod and the piston into the first end portion of the cylinder, the piston and the piston rod being axially displaceable within the cylinder, and the piston sealingly dividing the chamber into first and second chambers; providing means for permitting fluid communication between the first chamber and the second chamber; forming a partial chamber in the second end portion of the cylinder, the partial chamber for containing a gas under pressure, and the partial chamber having a substantially open portion during assembly of the shock absorber; closing and sealing the second end portion of the cylinder, using the apparatus for assembling, by the following steps: providing means for closing and sealing the second end portion of the cylinder; filling the partial chamber of the second end portion with compressed gas through the substantially open portion of the partial chamber; disposing the closing and sealing means in sealing engagement with the partial chamber of the second end portion of the cylinder; and fixedly fastening at least a portion of the closing and sealing means to at least a portion of the second end portion of the cylinder to form a complete chamber, and to hold the closing and sealing means and the second end portion of the cylinder together, and further, to seal the complete chamber to substantially eliminate leakage of the gas from inside the complete chamber; to produce a product comprising the shock absorber.

Another aspect of the invention resides broadly in an apparatus for filling and sealing at least one end of a vibration damper, the apparatus comprising: first means for holding at least a portion of a vibration damper in a predetermined position; means for providing a connection between the apparatus and a compressed gas source; second means for holding, the second holding means for holding closing and sealing means, the closing and sealing means for closing and sealing at least one end portion of the vibration damper, the at least one end portion having a diameter; means for permitting movement, during assembly of the vibration damper, of at least one of: the first holding means and the vibration damper, one with respect to the other; at least one of the first holding means and the vibration damper being movable into at least a first position and a second position; the first position being a position wherein the first holding means is disposed at least immediately adjacent the at least one end portion of the vibration damper; and the second position being a position wherein the first holding means is disposed at a substantial distance from the at least one end portion of the vibration damper, to provide access to the vibration damper for an apparatus for sealing and connecting the closing and sealing means to the at least one end portion of the vibration damper.

Yet another aspect of the invention resides broadly in a shock absorber, such as for a motor vehicle, the shock absorber comprising: a cylinder defining a chamber therein, the cylinder containing a damping medium; a piston rod sealingly projecting into the cylinder and being axially displaceable within the cylinder, the piston rod having a longitudinal axis, the longitudinal axis defining an axial direction; a piston being attached to the piston rod, the piston being slidably disposed within the cylinder to sealingly divide the chamber into first and second chambers; means for permitting fluid communication between the first chamber and the second chamber; a first end and a second end; the first end comprising first means for connecting the shock absorber to the body of a motor vehicle; the second end comprising second means for connecting the shock absorber to the suspension of a motor vehicle; the cylinder being disposed between the first end and the second end; the cylinder comprising: a first end portion and a second end portion, the piston rod sealingly projecting into the first end portion of the cylinder; the second end portion comprising: means for closing and sealing the second end portion of the cylinder; a complete chamber containing a gas under pressure; the second end portion having been closed and sealed by the following steps: forming a partial chamber in the second end portion, the partial chamber for containing a gas under pressure, the partial chamber having a substantially open portion; filling the partial chamber with compressed gas through the substantially open portion of the partial chamber; disposing the closing and sealing means in sealing engagement with the partial chamber of the second end portion of the cylinder; and fixedly fastening at least a portion of the closing and sealing means to at least a portion of the second end portion of the cylinder to form the complete chamber, and to hold the closing and sealing means and the second end portion of the cylinder together, and further, to seal the complete chamber to substantially eliminate leakage of the gas from inside the complete chamber.

BRIEF DESCRIPTION OF THE DRAWINGS

The present invention and its advantages are described in greater detail below with reference to the accompanying drawings, in which.

DESCRIPTION OF THE PREFERRED EMBODIMENT

Figure 1:
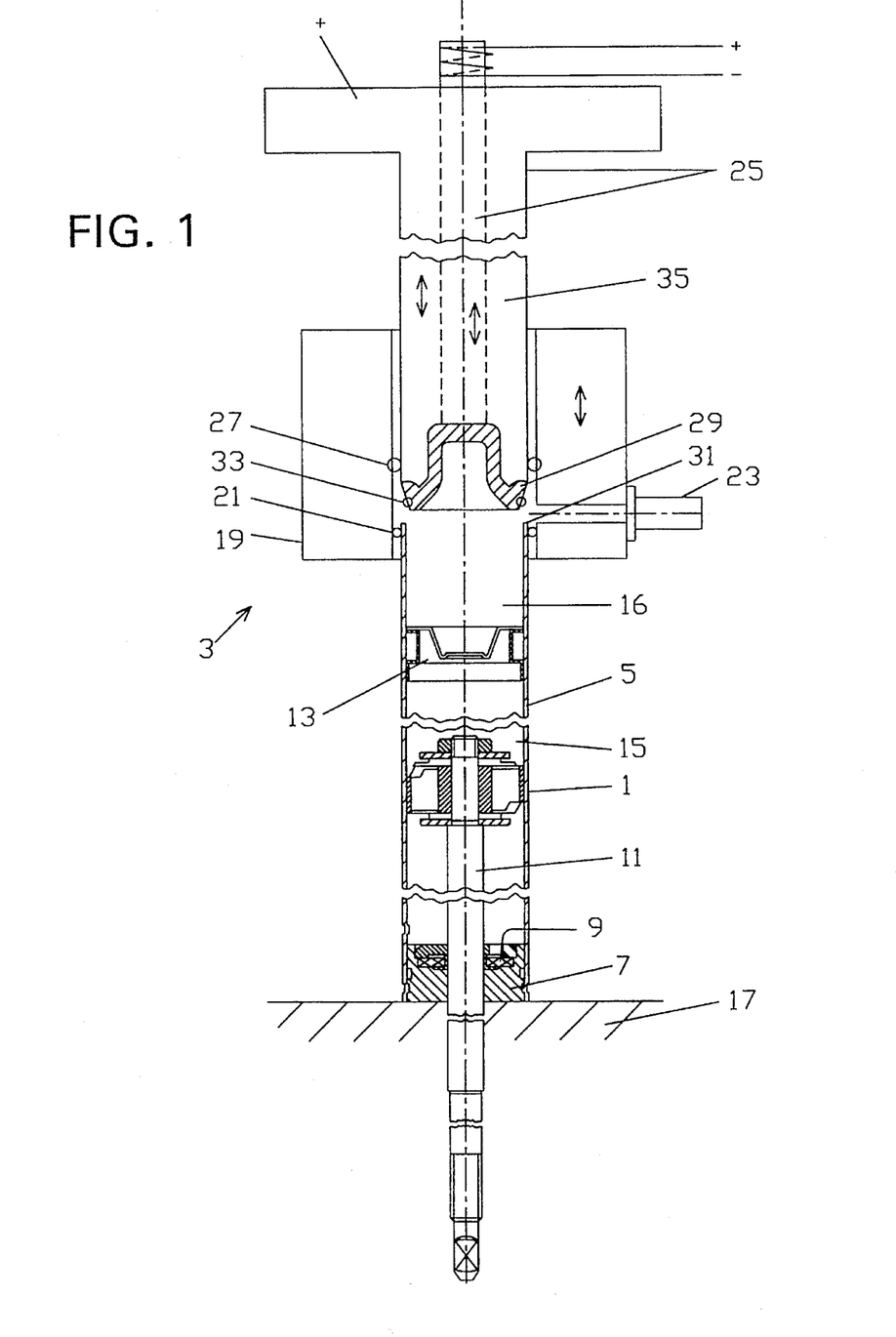
FIG. 1 shows the piston-cylinder unit inside a filling and closing apparatus during filling of the piston-cylinder unit.
Figure 1A:
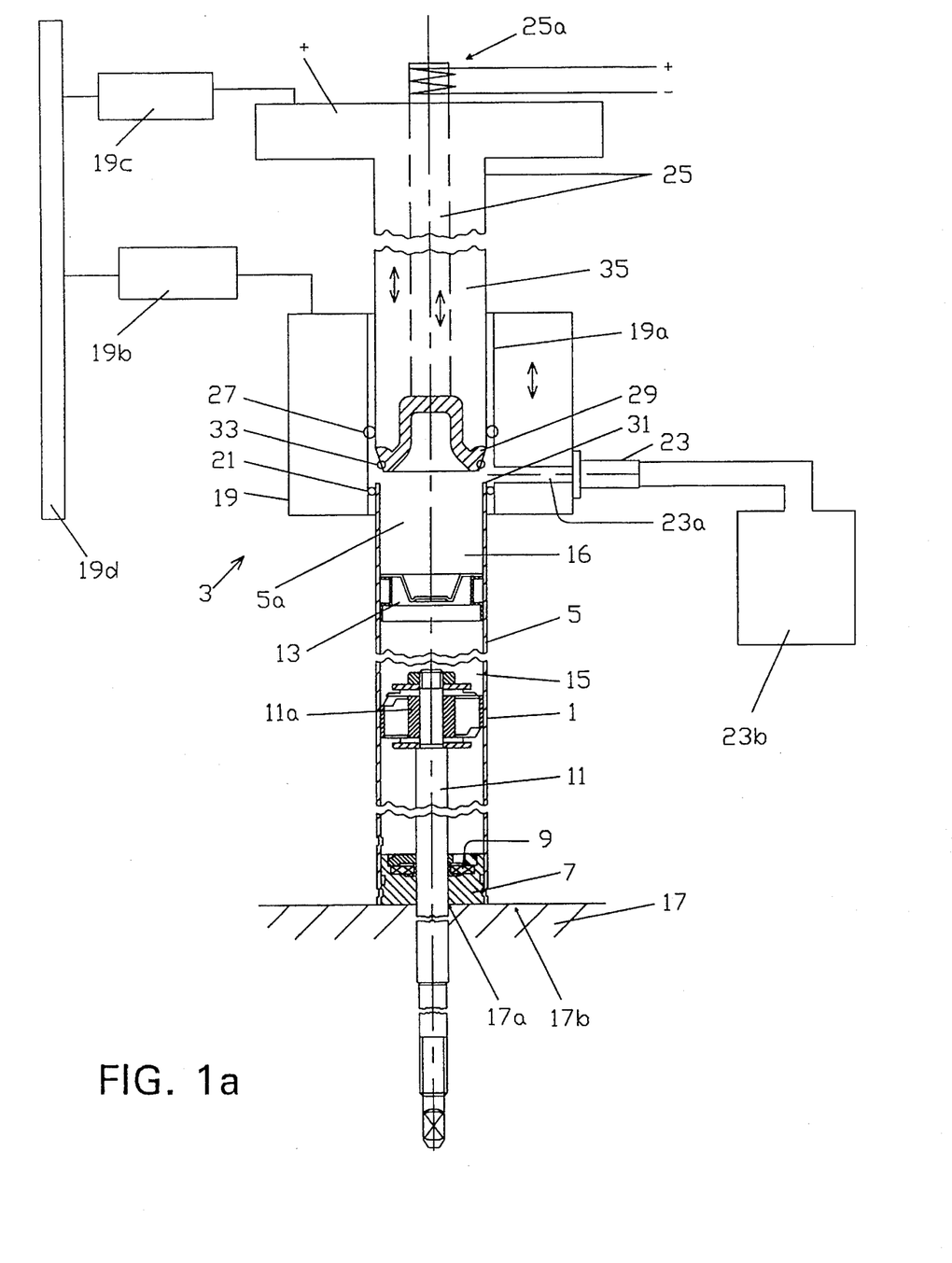
FIG. 1a shows substantially the same view as FIG. 1, but shows additional components.

FIGS. 1 and 1a show a piston-cylinder unit 1 inside an apparatus 3 for the filling and closing of the piston-cylinder unit 1. The piston-cylinder unit 1 can generally include, among other components, a cylinder tube 5, which cylinder tube 5 can preferably be closed on one end by means of a conventional piston rod guide 7 and a seal 9. An axially movable piston rod 11, which piston rod 11 can preferably support a piston 11a (see FIG. 1a), can preferably be located inside the piston-cylinder unit 1 preferably within a work chamber 15. A partition 13 can also preferably be provided to delimit the end of the work chamber 15, which work chamber 15 can preferably be filled with a damping medium. On the other side of the partition 13, that is, opposite to the work chamber 15, the piston-cylinder unit 1 can preferably be configured to have a gas chamber 16. This gas chamber 16 can preferably extend substantially to an open end 5a (see FIG. 1a) of the cylinder tube 5. In accordance with at least one embodiment of the present invention, the partition 13 can preferably be movable within the cylinder tube 5, to thereby enable the gas in the gas chamber 16 to provide an impact absorbing function, as well as a volume compensating function, as the piston rod 11 and the piston 11a move within the cylinder tube 5.

The complete piston-cylinder unit 1, which piston-cylinder unit 1 in this embodiment of the present invention is substantially in the form of a single-tube shock absorber, can preferably be supported on a work bench 17. In accordance with at least one embodiment of the present invention as depicted in FIG. 1a, the work bench 17 can preferably have a hole 17a, which hole 17a can preferably be disposed in a surface 17b of the work bench 17. The hole 17a can preferably be configured for receiving the piston rod 11 therein, thereby making it possible for the piston-cylinder unit 1 to rest on surface 17b of the work bench 17.

The apparatus 3 for filling and closing the piston-cylinder unit 1 can preferably be provided with a slip-on unit 19, which slip-on unit 19 can preferably be configured to be fitted onto the cylinder tube 5. The open end 5a (see FIG. 1a) of the cylinder tube 5 can preferably extend into the slip-on unit 19. The slip-on unit 19 can preferably be connected in a gas-tight manner to the cylinder tube 5, preferably by means of seals 21. Further, the slip-on unit 19 can preferably have a gas delivery connection 23 for providing gas into the gas chamber 16. This delivery connection 23 can preferably be connected to a compressed gas source 23b (see FIG. 1a), which gas source 23b could possibly be a gas tank containing gas, for example nitrogen, under pressure. Further, in accordance with at least one embodiment of the present invention, the slip-on unit 19 can also preferably have a filling chamber or passage 23a (see FIG. 1a) which can preferably be connected to the delivery connection 23 on one side, and on the other side can preferably empty into an interior opening 19a of the slip-on unit 19.

The filling and closing apparatus 3 can also preferably include a base support 25 that can preferably be moved axially inside the slip-on unit 19. In accordance with at least one embodiment of the present invention, base support 25 can preferably be moved via a motor 19c, which motor 19c can preferably be supported on a frame 19d. The base support 25 can likewise preferably be connected in a gas-tight manner to the slip-on unit 19, preferably by means of seals 27, thereby forming an essentially air-tight chamber for the filling of the piston-cylinder unit 1. A sealing element 29 can preferably be located inside the base support 25. The sealing element 29 can be considered to represent the base 29 of the piston-cylinder unit 1. The sealing element or base 29 can preferably be held within the base support 25, so that the base 29 can be precisely positioned with respect to the cylinder tube 5 to which the base support 25 is already connected. The retaining forces, which preferably position base 29 inside of base support 25, can preferably be produced by means of a friction fit between the base support 25 and the base 29. In accordance with one embodiment of the present invention, the friction fit between the base 29 and the base support 25 could possibly be provided by the seal 27, i.e. the seal 27 pushes against the outer wall of the base support 25 and the base support 25 then pushes against the edges of the base 29. In other words, the base 29 can be held in the base support 25 by means of a snug fit between the two, so that the base 29 will preferably not fall out of the base support 25. Other possibilities for retaining the base 29 within the base support 25 include a vacuum connection for holding the base 29 within base support 25 by suction. In accordance with an additional embodiment of the present invention, the base 29 can preferably be held and/or positioned inside the base support 25 by means of a magnet 25a (see FIG. 1a), whereby it has proven advantageous that the magnets be manually-operated electromagnets, in particular because it can be essentially impossible to prevent contamination.

Figure 2:
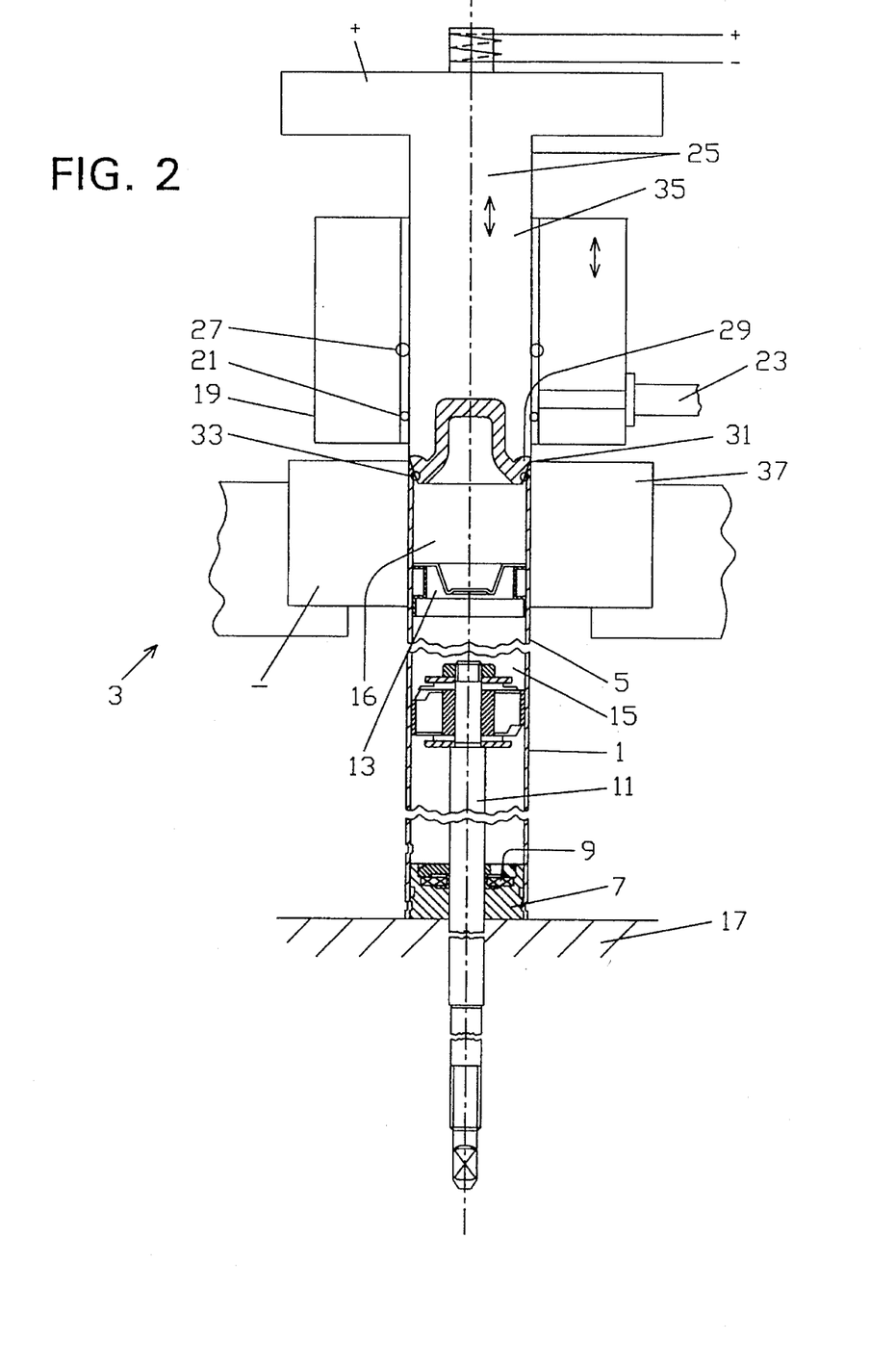
FIG. 2 shows the piston-cylinder unit and a filling and closing apparatus during welding.
Figure 2A:
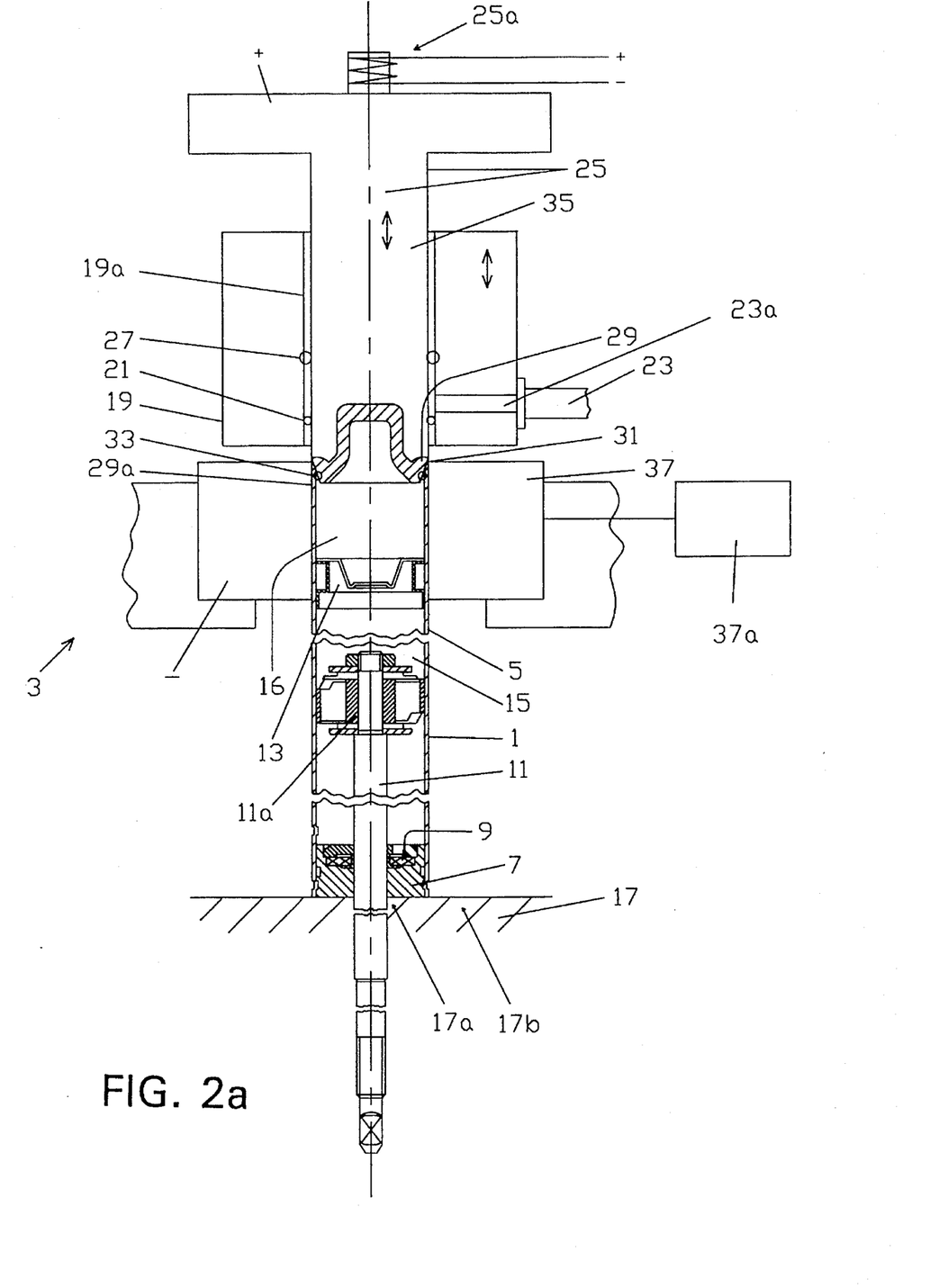
FIG. 2a shows substantially the same view as FIG. 2, but shows additional components.

During the filling process shown in FIGS. 1 and 1a, the base support 25 can preferably hold the base 29 at a distance from the open end 5a (see FIG. 1a) of the cylinder tube 5. The gas chamber 16 can preferably be filled with gas via the delivery connection 23. When the filling process is completed, in order to close off open end 5a (see FIG. 1a) and to seal the gas within chamber 16, the base 29 can then be moved onto an end face 31 of the cylinder tube 5. At this juncture, the base 29 would essentially still need to be held in place against the pressure inside the gas chamber 16. During this positioning or placement step, the base support 25 can preferably be moved axially toward the piston-cylinder unit 1 to move the base 29 into position on the piston-cylinder unit 1. In other words, and in accordance with at least one embodiment of the present invention, base support 25 preferably moves axially towards the piston-cylinder unit 1 within slip-on unit 19, and once base 29 is in the desired position, the base support 25 can hold base 29 against open end 5a. Essentially as soon as the base 29 comes into contact with the end face 31 of the cylinder 5, the gas chamber 16 can be hermetically sealed, preferably by means of a seal 33 between the base 29 and the cylinder tube 5. This operating condition is shown in FIGS. 2 and 2a. The slip-on unit 19 can then be moved axially away from the piston-cylinder unit 1, thereby exposing the end 5a of the piston-cylinder unit 1, which end 5a is preferably no longer an "open" end. Further, and in accordance with one embodiment of the present invention, as slip-on unit 19 moves axially away from the piston-cylinder unit 1, the base support 25 can preferably remain essentially stationary preferably to hold base 29 in position so that the welding operation can be performed. Still further, in accordance with one embodiment of the present invention, the slip-on unit 19 can be moved via a motor 19b (see FIG. 1a), which motor 19b can preferably be supported on frame 19d. The frame 19d can also be used to support the other components of the present invention, for example, in an assembly line.

In accordance with one embodiment of the present invention, the base support 25 could move the base 29 axially towards the open end 5a of the cylinder tube 5 with sufficient force to cause elastic or plastic deformation of the base 29 and/or the cylinder tube 5. In accordance with this embodiment, the plastically deformed region could possibly provide enough stabilization between the cylinder tube 5 and the base 29 so that the holding force by the base support 25 may not be needed to hold the base 29 against open end 5a. In other words, the plastically deformed region of the cylinder tube 5 and the base 29 may be a fastening which could be strong enough to withstand the outward force of the compressed gas inside open end 5a, and thus this fastening could conceivably hold base 29 against open end 5a without the aid of base support 25 before the welding process takes place.

Because the piston-cylinder unit 1 can preferably have essentially the same outside diameter as the base support 25, the design and construction of the seal region for the seals 21 and 27 typically poses essentially no problems of any kind. After the slip-on unit 19 has been axially displaced, preferably in a direction away from the piston-cylinder unit 1, the end of the piston-cylinder unit 1 with the base 29 can be freely accessible to a welding apparatus for welding the base 29 to the cylinder tube 5.

In a particularly preferred embodiment of the present invention, the welding apparatus can preferably include, among other components, a welding electrode 35, which welding electrode 35 can be essentially identical to the base support 25. In other words, the welding electrode 35 can be an integral part of, and form, the base support 25. As such, the base support 25 can preferably be simultaneously an integral component of two separate circuits, whereby one circuit can preferably produce the magentic force to hold the base 29 within the base support 25, and the second circuit can preferably supply a welding current for carrying out a welding operation. In a further process step, at least one earth ground terminal 37 can be connected to the base end 29a (see FIG. 2a) of the piston-cylinder unit 1. By means of this ground terminal 37, a circuit can preferably be created and the piston-cylinder unit 1 can preferably be interposed in this circuit. In accordance with at least one embodiment of the present invention, the piston-cylinder unit 1 may form a part of either or both circuits.

In accordance with one embodiment of the present invention, the ground terminal can preferably be moved relative to the piston-cylinder unit 1 by means of a motor 37a (see FIG. 2a). The motor 37a can preferably also be supported on frame 19d (not shown in FIG. 2a).

The welding electrode 35 and the ground terminal 37 can preferably be integral components of a capacitor discharge welding machine. This type of welding offers the advantage that practically no warping occurs on the piston-cylinder unit 1 when a gas-tight weld is performed preferably via the end face 31 to the base 29. Another significant advantage is that the gas pressure inside the gas chamber 16 essentially cannot influence the quality of the weld seam with capacitor discharge welding, since on the one hand, essentially only a very thin peripheral zone of the contact surfaces on the base 29 or the end face 31 is heated. Further, a permanent bond can preferably be established by means of the pressure from the base support 25 together with the heat preferably from the welding process, and, on the other hand, the O-ring or seal 33 can preferably protect the weld site from the gas pressure. The seam in the base/end face area essentially requires no extra finishing operations and can simply be painted. That is, the welding seam at the base end 29a essentially requires no extra finishing operations.

After the retraction of the ground terminal 37, the piston-cylinder unit 1 can preferably be removed from the apparatus 3. The slip-on unit 19 then preferably moves back to its original axial position for the filling of the next piston-cylinder unit 1. The axial movements of the slip-on unit 19 are required because the seal 21 essentially should not be subjected to any increase in temperature if the welding process is performed between the welding electrode 35 in the base 29, the cylinder tube 5 and the earth terminal 37. In other words, the axial movement of the slip-on unit 19 away from the piston-cylinder unit 1 is necessary so that the seal 21 does not become exposed to an increased temperature, which increased temperature could cause melting or deformation of the seal 21.

In accordance with an alternative embodiment of the present invention, the base support, welding electrode 35, terminal 37, and the slip-on unit 19 may all be separate components from one another. In accordance with yet an additional embodiment of the present invention, the base support 25, welding electrode 35 and the terminal 37 may be an integral component, while the slip-on unit 19 is a separate component.

In accordance with yet an additional embodiment of the present invention, the piston-cylinder unit 1, instead of being placed in work bench 17, may be axially movable with respect to the slip-on unit 19. Thus, the slip-on unit 19 could remain essentially stationary, while the piston-cylinder unit 1 could move upwards and downwards in order to carry out the process in accordance with the present invention as described above. In accordance with this embodiment of the present invention, base support 25 can still preferably move within slip-on unit 19, as discussed above.

The process described above in accordance with the present invention is not limited to welding bases on the ends of shock absorber tubes, but can be used for a variety of other purposes. Further, the primary advantage of the process and apparatus 3 in accordance with the present invention is essentially that the piston-cylinder unit 1 can be completely assembled so that filling is essentially the only additional operation required. In other words, and in accordance with at least one embodiment of the present invention, an important advantage of the apparatus 3 and process in accordance with the present invention is that the piston-cylinder unit 1 can essentially be completely assembled, except for the filling of the chamber 16 and the closing of the open end 5a of the cylinder tube 5.

It should be understood that the welding operation described hereinabove is only one type of fastening method for securing the base 29 on or in the container tube 5, and that other types of fastening methods are within the scope of the present invention. One example of such a type of fastening method is the use of adhesives. Another type of fastening method may involve mechanical deformation of portions of the base 29 and or portions of the end portion of the container tube 5.

Figure 3:
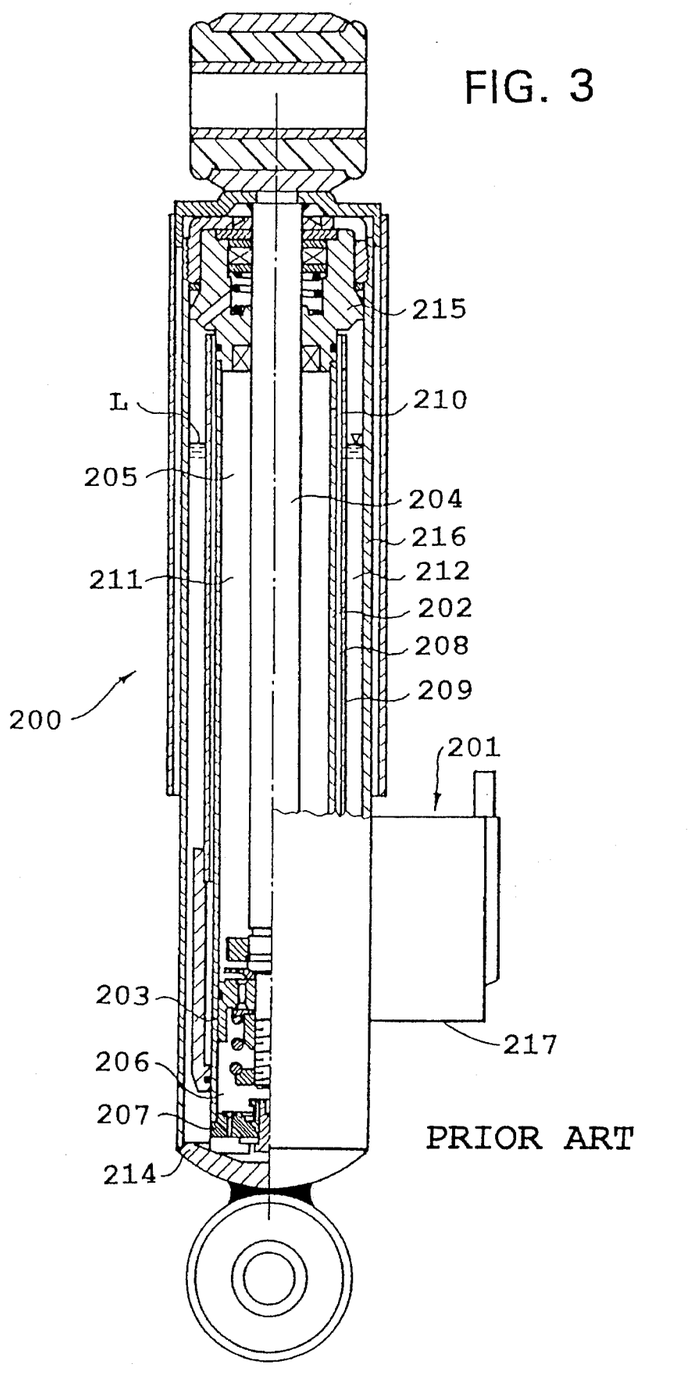
FIGS. 3 and 4 show one example of a vibration damper in which the present invention may be incorporated.
Figure 4:
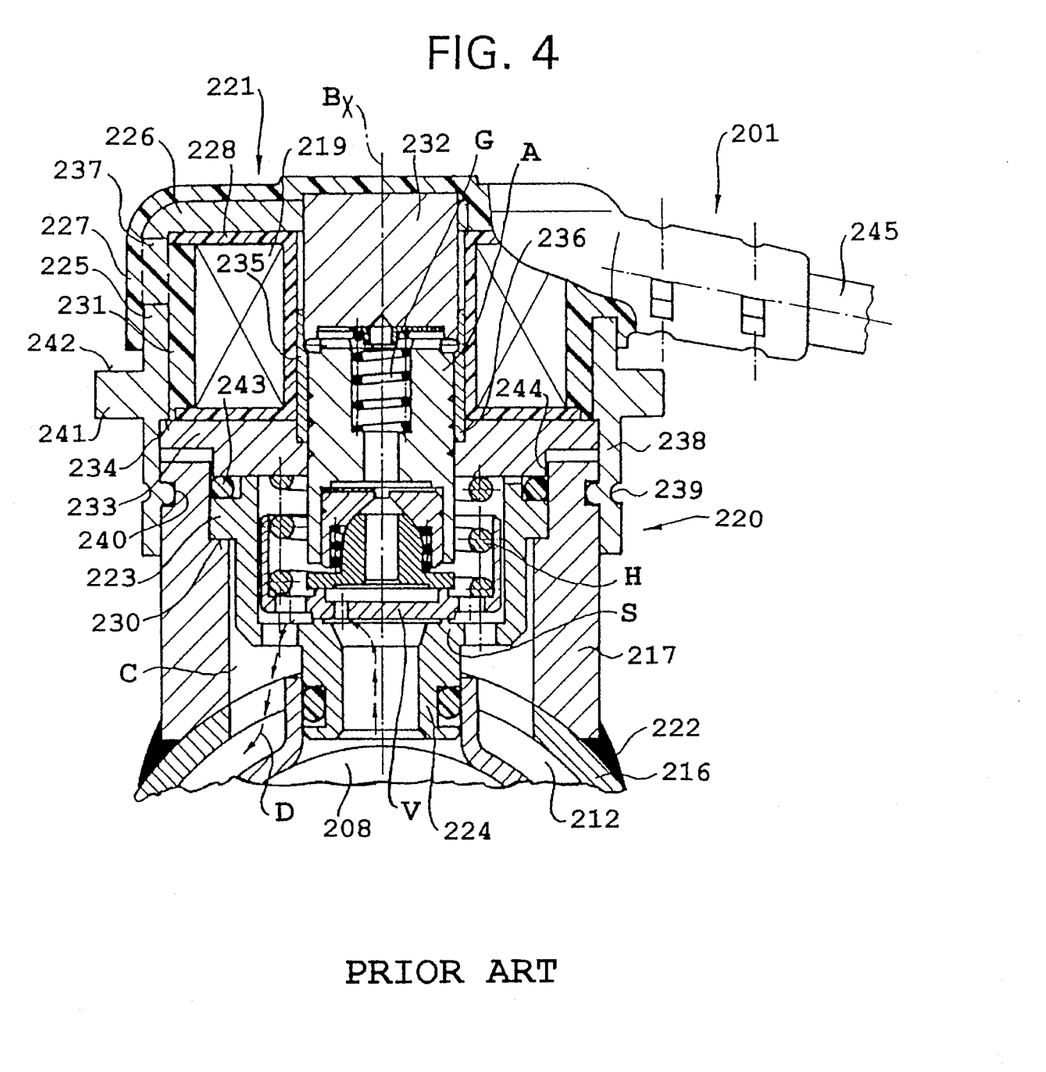

FIGS. 3 and 4 show a typical shock absorber or vibration damper in which the embodiments of the present invention may conceivably be incorporated. It should be understood that the components found hereinbelow may be considered to be interchangeable with similar components discussed hereinabove with reference to FIGS. 1 through 2*a*.

FIG. 3 shows a complete shock absorber or oscillation damper 200, a detailed illustration of the valve unit 201 being omitted for the sake of clarity. The oscillation damper 200 could be closed at one end thereof in accordance with the present invention. It should be noted that the oscillation damper 200 is shown in an opposite position from the position in which it could be provided with pressurized gas in accordance with the present invention, as discussed above. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Base member 214 could, in accordance with one embodiment of the present invention, be equated with base 29 of the present invention. Both the upper and the lower working chambers 211, 206 are preferably filled with a liquid. The compensating chamber 212 is also filled with damping liquid up to the level L, and possibly contains a pressurized gas above the level L. This pressurized gas could possibly be provided by the filling operation as discussed above. The bottom valve unit 207 provides communication between the working chamber 206 and the compensating chamber 212. The piston 203 provides communication between the lower working chamber 206 and the upper working chamber 211. According to an illustrative example, the oscillation damper 200 works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. This is shown in more detail in FIG. 4, which will be described later. As long as the valve unit 201 is closed, the bypass established by the connecting orifice 210, the fluid path 208 and the valve unit 201 is also closed. This is the hardest mode of operation of the oscillation damper 200. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. As such, the damping force can again be reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

In FIG. 4 one can again see the fluid path 208 and the compensating chamber 212, which are interconnectable through the valve unit 201. The fluid path 208 is connected to the upper working chamber 211 as shown in FIG. 3. The flow direction from the fluid path 208 to the compensating chamber 212 across the valve unit 201 is indicated in FIG. 4 by the dotted line D provided with arrows indicating the flow direction both for inward movement and outward movement of the piston rod 204 with respect to the pressure pipe 202. One can see in FIG. 4 a valve member V which can be lifted with respect to a valve seat S, such as to open the flow path D from the fluid path 208 to the compensating chamber 212.

For explaining the principles of the embodiment of the present invention shown in FIGS. 3 and 4, it is sufficient to say that the valve member V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 219 which is energized through a current supple cable 245.

The valve unit 201 comprises a housing 220. This housing 220 is composed by the side tube 217 and a cover unit 221. The side tube 217 is welded at 222 to the container tube 216. The cover unit 221 is fastened to the side tube 217.

A pot-shaped valve components housing 223 is inserted into the side tube 217 and is axially located on a shoulder face 230 inside the side tube 217. Various valve components are located inside the valve components housing 223. The lower end of the valve components housing 223 is shaped as a tube section 224, which provides the valve seat S and is sealingly connected to the fluid path 208.

The cover unit 221 comprises an iron jacket 225 integral with an iron end wall 226. The iron jacket 225 and the iron end wall 226 are coated with a plastic layer 227. The annular electromagnetic coil 219 is housed within the iron jacket 225. This electromagnetic coil 219 is carried by a coil carrier 228, which is annular about the axis $B_x$ and is open in a radially outward direction. The coil carrier 228 is closed in the radially outward direction by a plastics material 231 integral with the plastic layer 227 through openings 237 of the iron jacket 225. The plastics layer 227 and the plastics material 231 are integrally moulded by injection moulding with the iron jacket 225, the iron end wall 226 integral therewith, and the electromagnetic coil 219 and carrier 228 being inserted into the injection mould.

A ferromagnetic core 232 is inserted into a central opening of the iron end wall 226 and covered by the plastics layer 227. An iron flange portion 233 is provided at the lower side of the electromagnetic coil 219 and is engaged with a shoulder face 234 of the iron jacket 225. A pole tube 235 is seated within an annular recess 236 of the iron flange portion 233. The pole tube 235 is sealingly connected to the iron flange portion 233 and to the ferromagnetic core 232. The armature A is guided within the pole tube 235. The pole tube 235 is made of nonmagnetic material so that the magnetic field lines are deflected by the lower end of the pole tube 235. The iron jacket 225, the iron end wall 226, the ferromagnetic core 232 and the iron flange portion 233 form a ferromagnetic core arrangement which toroidally surrounds the electromagnetic coil 219.

The cover unit 221 is fastened to the side tube 217 by a sleeve-shaped extension 238 of the iron jacket 225. This sleeve-shaped extension 238 axially overlaps the side tube 217 by a circumferential bead 239 being embossed into a circumferential groove 240 on the radially outer face of the side tube 217. The iron jacket 225 is provided with a pretensioning flange 241. The pretensioning flange 241 offers a pretension face 242. The cover unit 221 can be pretensioned in downward direction as shown in FIG. 4 toward the container tube 216 by a pretensioning tool engaging the container tube 216, on the one hand, and the pretensioning face 242, on the other hand. As such, the iron flange portion 233 can be pressed against the upper end of the valve components housing 223, the valve components housing 223 is engaged with the shoulder face 230 of the side tube 217, and the iron flange portion 233 is engaged with the shoulder face 234 of the iron jacket 225. The helical compression spring H is compressed between the iron flange portion 233 and the valve member V, which is seated on the valve seat S.

While maintaining this pretension of the cover unit 221 against the side tube 217, the bead 239 is rolled or caulked into the circumferential groove 240 of the side tube 217 so that after removing the pretensioning tool an internal pretension is maintained. A sealing ring 243 is, therefore, maintained in sealing engagement with the valve components housing 223, the iron flange portion 233 and the side tube 217. As such, the compartment C confined by the side tube 217 and the cover unit 221 is sealed against atmosphere. All components of the valve unit 201 are positioned with respect to each other, and the helical compression spring H as well as the helical compression spring G and further springs are biased to the desired degree.

It is to be noted that the upper end of the side tube 217 is radially engaged at 244 with the iron flange portion 233 such that when rolling or caulking the bead 239 into the groove 240, no deformation of the side tube 217 and of the iron jacket 225 can occur.

The electromagnetic coil 219 is completely separated from the liquid within the compartment C by the iron flange portion 233. The pretension during connecting the cover unit 221 and the side tube 217 is selected such that no play can occur.

One feature of the invention resides broadly in the process for the filling of a gas chamber 16 of piston-cylinder unit 1 with compressed gas and for closing this gas chamber 16 with a sealing element in the form of a base 29, whereby the piston-cylinder unit 1 is placed in an apparatus 3 which can be connected to a compressed gas source from which the gas chamber 16 is filled, whereby the base 29 is inserted by the apparatus 3 into the open end of the piston-cylinder unit 1, after which the piston-cylinder unit 1, now under pressure and closed off by the base 29, is welded shut.

Another feature of the invention resides broadly in the process for the filling of a gas chamber 15 of piston-cylinder unit 1 with compressed gas and for closing this gas chamber 15 with a sealing element in the form of a base 29, whereby the piston-cylinder unit 1 is placed in an apparatus 3 which can be connected to a compressed gas source from which the gas chamber 15 is filled, whereby the base 29 is inserted by through the apparatus 3 into the open end of the piston-cylinder unit 1, after which the piston-cylinder unit 1, now under pressure and closed off by the base 29, is welded shut.

Another feature of the invention resides broadly in the process characterized by the fact that the welding process is performed by means of capacitor discharge welding.

Yet another feature of the invention resides broadly in the apparatus for a process consisting of a slip-on unit 19 which has a filling chamber with a delivery connection 23, which chamber forms a connection to a compressed gas source, a base support 25 which holds the base 29 during assembly, characterized by the fact that the slip-on unit 19 is mobile relative to the piston-cylinder unit 1 so that in one operating position of the slip-on unit 19, the end of the piston-cylinder unit 1 with the base 29 is accessible and a welding apparatus can be applied to the free end of the piston-cylinder unit 1.

Still another feature of the invention resides broadly in the apparatus characterized by the fact that the slip-on unit 19 can be displaced axially with respect to the piston-cylinder unit 1.

A further feature of the invention resides broadly in the apparatus characterized by the fact that the base support 25 is made up of a welding electrode 35.

Another feature of the invention resides broadly in the apparatus characterized by the fact that the welding electrode 35 has essentially the same outside diameter as the piston-cylinder unit 1.

Yet another feature of the invention resides broadly in the apparatus characterized by the fact that the base support 25 is oriented concentric to the welding electrode 35.

Still another feature of the invention resides broadly in the piston-cylinder unit manufactured according to the process consisting of a cylinder tube 5 which is closed on one end and is filled via the other, open end, whereby after filling, the cylinder tube 5 forms a gas chamber 16 closed by a base 29, characterized by the fact that a seal 33 is located between the base 29 and the cylinder tube 5, and seals the gas chamber 16 against the atmosphere before the welding process takes place.

Still another feature of the invention resides broadly in the piston-cylinder unit manufactured according to the process consisting of a cylinder tube 5 which is closed on one end and is filled via the other, open end, whereby after filling, the cylinder tube 5 forms a gas chamber 15 closed by a base 29, characterized by the fact that a seal 33 is located between the base 29 and the cylinder tube 5, and seals the gas chamber 15 against the atmosphere before the welding process takes place.

Examples of automatic machines which may be used in accordance with the present invention may be disclosed in the following U.S. Pat. Nos. 5,186,037 to Bihler on Feb. 16, 1993, entitled "Processing Machine, Expecially Automatic Punching and Bending Machine"; 5,221,884 to Teshima on Jun. 22, 1993, entitled "Numerical Control Apparatus"; and 5,239,478 to Yamamoto et al. on Aug. 24, 1993, entitled "Method for Determining Groove Machine Process Based on Numerical Control Information Generating Function".

Examples of shock absorber assemblies and components associated therewith, including damping valves in pistons of shock absorbers, which may be utilized in accordance with the embodiments of the present invention, may be found in the following U.S. Pat. Nos. 4,986,393, which issued to Preukschat et al. on Jan. 22, 1991; 4,749,070, which issued to Moser et al. on Jun. 7, 1988; and 4,723,640, which issued to Beck on Feb. 9, 1988.

Examples of shock absorber assemblies which may be utilized in accordance with the present invention may be disclosed in the following U.S. Pat. Nos. 4,838,393 to Mourray et al. on Jun. 13, 1989, entitled "Hydro-mechanical Stop Having a Restrictive Passage"; 4,817,928, to Paton on Apr. 4, 1989, entitled "Suspension System"; 4,527,674 to Mourray on Jul. 9, 1985, entitled "Shock Absorber With a Hydro-mechanical Stop"; and 4,749,069 to Knecht et al. on Jun. 7, 1988, entitled "Vibration Damper for Motor Vehicles Having an Arrangement for Varying Damping Thereof".

An example of a welding apparatus which could be used in accordance with the present invention may be disclosed in U.S. Pat. No. 5,264,679 to Martin on Nov. 23, 1993, entitled "Alternating Current Welding Apparatus".

Some type of industrial robots and assembly processes using such robots which could possibly be utilized in accordance with the present invention may be disclosed in the following U.S. Pat. Nos. 5,197,846 to Uno et al., entitled "Six-Degree-of-Freedom Articulated Robot Mechanism and Assembling and Working Apparatus Using Same"; 5,203,073 to Kotake et al., entitled "Apparatus for Assembling Exterior Parts of a Motorcar"; 5,267,385 to Ikeda et al., entitled "Automatic Assembly Apparatus"; 5,295,778 to Hirai et al., entitled "Assembling Apparatus"; and 5,319,845 to Watanabe, et al., entitled "Assembling Apparatus Using Robot".

Types of seals which may be used in accordance with the present invention may be disclosed in the following U.S. Pat. Nos. 5,217,233 to Pecht et al. on Jun. 8, 1993, entitled "Spiral Groove Seal System for Sealing a High Pressure Gas"; 5,249,813 to Botto on Oct. 5, 1993, entitled "Sealing Ring Structure"; 5,269,537 to Keisel on Dec. 14, 1993, entitled "Composite Radial Seal"; and 5,326,112 to Paykin on Jul. 4, 1994, entitled "Seal for High Pressure Applications".

Types of electromagnets which may be used in accordance with the present invention may be disclosed in the following U.S. Pat. Nos. 5,191,306 to Kaji et al. on Mar. 2, 1993, entitled "Miniature Electromagnetic Assembly and Relay With the Miniature Electromagnet Assembly"; 5,235,303 to Xiao on Aug. 10, 1993, entitled "Miniaturized Universal Electromagnet Capable of Operation in Wide Voltage Range"; and 5,243,314 to Maruyama on Sep. 7, 1993, entitled "Magnetic Holding Device".

Types of linear motion apparatus which may be used in accordance with the present invention may be disclosed in the following U.S. Pat. Nos. 5,228,380 to Still et al. on Jul. 20, 1993, entitled "Linear Drive"; 5,251,500 to Torii on Oct. 12, 1993, entitled "Industrial Robot With a Compound Drive Mechanism"; and 5,330,272 to Stoll on Jul. 19, 1994, entitled "Linear Drive".

All of the patents, patent applications and publications recited herein, and in the Declaration attached hereto, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A process of making a shock absorber for a motor vehicle by using an apparatus for assembling, said process comprising the steps of:

providing a cylinder, the cylinder defining a chamber therein, the cylinder having a first end portion and a second end portion;

providing a damping medium;

providing a piston rod, the piston rod having a longitudinal axis, the longitudinal axis defining an axial direction;

providing a piston;

providing first means for connecting the shock absorber to the body of a motor vehicle;

providing second means for connecting the shock absorber to the suspension of a motor vehicle;

providing the apparatus for assembling;

said process further comprising the steps of:

filling at least a portion of the chamber with the damping medium;

closing and sealing the first end portion of the cylinder;

attaching the piston to the piston rod;

inserting the piston rod and the piston into the first end portion of the cylinder, the piston and the piston rod being axially displaceable within the cylinder, and the piston sealingly dividing the chamber into first and second chambers;

providing means for permitting fluid communication between the first chamber and the second chamber;

forming a partial chamber in the second end portion of the cylinder, the partial chamber for containing a gas under pressure, and the partial chamber having a substantially open portion during assembly of the shock absorber;

closing and sealing the second end portion of the cylinder, using said apparatus for assembling, by the following steps;

providing means for closing and sealing the second end portion of the cylinder;

filling the partial chamber of the second end portion with compressed gas through the substantially open portion of the partial chamber;

disposing the closing and sealing means in sealing engagement with the partial chamber of the second end portion of the cylinder; and fixedly fastening at least a portion of the closing and sealing means to at least a portion of the second end portion of the cylinder to form a complete chamber, and to hold the closing and sealing means and the second end portion of the cylinder together, and further, to seal the complete chamber to substantially eliminate leakage of the gas from inside the complete chamber;

to produce a product comprising said shock absorber.

2. The process according to claim 1 wherein said step of fixedly fastening the at least a portion of the closing and sealing means to the at least a portion of the second end portion further comprises welding the at least a portion of the closing and sealing means to the at least a portion of the second end portion.

3. The process according to claim 2 wherein said step of welding further comprises:

using the closing and sealing means as a first electrode;

charging the first electrode;

using the cylinder as a second electrode;

charging the second electrode oppositely of the first electrode; and welding the at least a portion of the closing and sealing means to the at least a portion of the second end portion by means of capacitor discharge welding.

4. The process according to claim 3 further comprising disposing a seal between said closing and sealing means and second end portion of said cylinder to seal said closing and said sealing means to said second end portion, prior to performing said step of welding.

5. The process according to claim 4 wherein:

said step of closing and sealing the second end portion of the cylinder is performed by means of said apparatus, said apparatus comprising:

first means for holding at least a portion of the shock absorber in a predetermined position;

means for providing a connection between said apparatus and a compressed gas source;

second means for holding, said second holding means for holding the closing and sealing means, the second end portion having a diameter;

means for permitting movement, during assembly of the shock absorber, of at least one of: said first holding means and shock absorber, one with respect to the other;

at least one of said first holding means and the shock absorber being movable into at least a first position and a second position;

said first position being a position wherein said first holding means is disposed at least immediately adjacent the second end portion of the shock absorber;

said second position being a position wherein said first holding means is disposed at a substantial distance from the second end portion of the shock absorber, to provide access to the shock absorber to an apparatus for sealing and connecting the closing and sealing means to the second end portion of the shock absorber;

said means for permitting movement comprises means for permitting axial movement of at least one of: said first holding means and the shock absorber, one with respect to the other;

said second holding means comprises a welding electrode, said welding electrode having a diameter;

said first electrode forming at least a portion of said welding electrode;

said diameter of said welding electrode is substantially the same as the diameter of the second end portion of the shock absorber;

said first holding means comprises:

a first side surface, a second side surface, and a longitudinal axis, said longitudinal axis defining an axial direction;

said first side surface and said second side surface being disposed at a substantial distance from one another;

said first side surface and said second side surface being disposed substantially perpendicular to said longitudinal axis of said first holding means;

an orifice extending from said first side surface to said second side surface, said orifice having a diameter, said diameter of said orifice being smaller than said diameter of said welding electrode;

said welding electrode is disposed within a portion of said orifice at least during assembly of the shock absorber;

said portion of said orifice is a first surface portion, said first surface portion being disposed substantially adjacent said first side surface of said first holding means;

said orifice comprises a second surface portion, said second surface portion being disposed substantially adjacent said second side of said first holding means;

said second surface portion of said orifice for receiving the second end portion of the shock absorber;

said apparatus further comprises:

a first seal disposed between said first surface portion of said orifice and said welding electrode;

a second seal disposed between said second surface portion and the at least one end portion of the shock absorber during assembly of the shock absorber; said orifice is a first orifice; said first holding means further comprises:

a third side surface, said third side surface extending axially between said first side surface and said second side surface;

said means for providing a connection comprises:

a second orifice extending substantially from said third side surface to said first orifice;

said second orifice for transferring compressed gas from the compressed gas source into the partial chamber of the shock absorber;

said second orifice is disposed between said first seal and said second seal;

said welding electrode is disposed substantially concentrically within said second holding means;

said means for permitting movement comprises means for permitting axial movement solely of said first holding means;

said apparatus for sealing and connecting comprises:

means for completing a welding circuit, said means for completing for being disposed at the second end portion of the shock absorber during the welding process;

said means for completing comprising means for permitting movement of the means for completing, with respect to the shock absorber;

said second holding means comprises:
  a first end part and a second end part;
  said first end part being disposed adjacent said first surface portion of said first holding means at least during the assembly of the shock absorber;
  said second end part being disposed adjacent said second surface portion of said first holding means at least during assembly of the shock absorber;
  said first end part of said second holding means comprises a T-shape;
  said second end part of said second holding means comprises a hole, the means for closing and sealing being disposed within said hole;
  one of the following a) and b):
    a) an electromagnet for retaining the closing and sealing means within said hole of said second end part; and
    b) means for frictionally holding the closing and sealing means within said hole of said second end part, said means for frictionally holding comprising at least said first seal;

said apparatus further comprising:
  first motor means for axially moving said second holding means;
  means for positioning the vibration damper during assembly, said positioning means having means for receiving a piston rod of the vibration damper;
said means for permitting movement of said first holding means further comprises:
  second motor means for axially moving said first holding means;
said apparatus further comprises:
  third motor means for moving said means for completing a circuit; and
said third surface portion of said first holding means comprises a cylindrical surface portion;
said step of closing and sealing the second end portion of the cylinder using said apparatus further comprises:
inverting the shock absorber and inserting the piston rod in the hole of the positioning means;
inserting the second end portion of the shock absorber into the second surface portion of the first holding means;
filling the partial chamber of the second end portion with the means for providing a connection;
axially moving the second holding means within the first holding means towards the shock absorber until the closing and sealing means is in sealing engagement with the second end portion;
axially moving the first holding means away from the shock absorber to provide access to the second end portion of the shock absorber while maintaining the position of the second holding means with respect to the shock absorber, to hold the closing and sealing means against the second end portion;
positioning the means for completing a circuit at the second end portion of the shock absorber;
welding the means for closing and sealing to the second end portion of the cylinder;
moving the means for completing a circuit away from the shock absorber; and
moving the second holding means and the first holding means axially away from the shock absorber.

6. The process according to claim 1 for producing said shock absorber, said shock absorber comprising:
  a cylinder defining a chamber therein, said cylinder containing a damping medium;
  a piston rod sealingly projecting into said cylinder and being axially displaceable within said cylinder, said piston rod having a longitudinal axis, said longitudinal axis defining an axial direction;
  a piston being attached to said piston rod, said piston being slidably disposed within said cylinder to sealingly divide said chamber into first and second chambers;
  means for permitting fluid communication between said first chamber and said second chamber;
  a first end and a second end;
  said first end comprising first means for connecting said shock absorber to the body of a motor vehicle;
  said second end comprising second means for connecting said shock absorber to the suspension of a motor vehicle;
  said cylinder being disposed between said first end and said second end;
  said cylinder comprising:
    a first end portion and a second end portion, said piston rod sealingly projecting into said first end portion of said cylinder;
    said second end portion comprising:
      means for closing and sealing said second end portion of said cylinder;
      a complete chamber containing a gas under pressure;
      said second end portion having been closed and sealed by the following steps:
        forming a partial chamber in said second end portion, said partial chamber for containing a gas under pressure, said partial chamber having a substantially open portion;
        filling said partial chamber of said second end portion with compressed gas through said substantially open portion of said partial chamber;
        disposing said closing and sealing means in sealing engagement with said partial chamber of said second end portion of said cylinder; and
        fixedly fastening at least a portion of said closing and sealing means to at least a portion of said second end portion of said cylinder to form said complete chamber, and to hold said closing and sealing means and said second end portion of said cylinder together, and further, to seal said complete chamber to substantially eliminate leakage of the gas from inside said complete chamber.

7. The process according to claim 6 for producing said shock absorber, wherein said step of fixedly fastening said at least a portion of said closing and sealing means to said at least a portion of said second end portion further comprises welding said at least a portion of said closing and sealing means to said at least a portion of said second end portion.

8. The process according to claim 7 for producing said shock absorber, wherein:
  said step of welding further comprises:
    using the closing and sealing means as a first electrode;
    charging the first electrode;
    using the cylinder as a second electrode;
    charging the second electrode oppositely of the first electrode; and
    welding the at least a portion of the closing and sealing means to the at least a portion of the second end portion by means of capacitor discharge welding;

said step of disposing said closing and sealing means immediately adjacent said partial chamber of said second end portion of said cylinder further comprises disposing a seal between said closing and sealing means and said second end portion of said cylinder to seal said closing and sealing means to said second end portion of said cylinder prior to performing said step of welding.

* * * * *

UNITED STATES PATENT AND TRADEMARK OFFICE
CERTIFICATE OF CORRECTION

PATENT NO. : 5,524,871
DATED : June 11, 1996
INVENTOR(S) : MÜLLER et al.

It is certified that error appears in the above-indentified patent and that said Letters Patent is hereby corrected as shown below:

In column 13, line 22, after 'Machine,', delete "Expecially" and insert --Especially--.

In column 15, line 37, Claim 4, before 'sealing', delete the first occurrence of "said".

Signed and Sealed this

Twenty-first Day of January, 1997

Attest:

BRUCE LEHMAN

*Attesting Officer*   *Commissioner of Patents and Trademarks*